United States Patent
Vincitore et al.

(10) Patent No.: US 10,780,973 B2
(45) Date of Patent: Sep. 22, 2020

(54) CARBON NANOTUBE HEATERS FOR AIRCRAFT HEATED FLOOR PANELS

(71) Applicant: Goodrich Corporation, Charlotte, NC (US)

(72) Inventors: Antonio M. Vincitore, Lakeville, MN (US); Jin Hu, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 324 days.

(21) Appl. No.: 15/875,588

(22) Filed: Jan. 19, 2018

(65) Prior Publication Data

US 2019/0225317 A1    Jul. 25, 2019

(51) Int. Cl.
| | |
|---|---|
| *H05B 3/28* | (2006.01) |
| *B64C 1/18* | (2006.01) |
| *B64D 13/08* | (2006.01) |
| *F24D 13/02* | (2006.01) |
| *H05B 3/14* | (2006.01) |
| *F24H 9/18* | (2006.01) |

(52) U.S. Cl.
CPC ............. *B64C 1/18* (2013.01); *B64D 13/08* (2013.01); *F24D 13/024* (2013.01); *F24H 9/1863* (2013.01); *H05B 3/145* (2013.01); *H05B 3/28* (2013.01); *H05B 2203/026* (2013.01); *H05B 2214/04* (2013.01)

(58) Field of Classification Search
CPC .... H05B 3/145; H05B 3/28; H05B 2203/026; H05B 2214/04; B64C 1/18; B64C 13/08; F24D 13/024; F24H 9/1863
See application file for complete search history.

(56) References Cited

U.S. PATENT DOCUMENTS

| | | | |
|---|---|---|---|
| 5,234,985 A | 8/1993 | Koo et al. | |
| 8,283,612 B2 | 10/2012 | Keite-Telgenbuescher et al. | |
| 8,752,279 B2 | 6/2014 | Brittingham et al. | |
| 2006/0138279 A1* | 6/2006 | Pisarski | B64D 13/08 244/118.5 |
| 2011/0180524 A1* | 7/2011 | Brittingham | C08J 3/18 219/202 |
| 2016/0021704 A1 | 1/2016 | Elverud | |
| 2016/0121993 A1* | 5/2016 | Nehring | B64C 1/18 244/118.5 |
| 2016/0343467 A1 | 11/2016 | Wen et al. | |

FOREIGN PATENT DOCUMENTS

| | | |
|---|---|---|
| JP | H0732518 A | 2/1995 |
| WO | WO2017/070520 A1 | 4/2017 |

OTHER PUBLICATIONS

Carbon nanotubes: The weird word of 'remote Joule heating', from https://phys.org/news/2012-04-carbon-nanotubes-weird-world-remote.html, Apr. 10, 2012, 6 pages.

(Continued)

*Primary Examiner* — Brian W Jennison
(74) *Attorney, Agent, or Firm* — Kinney & Lange, P.A.

(57) ABSTRACT

A floor panel includes a first structural layer, a film heater configured to emit far-infrared radiation, and a first open cell layer disposed between the film heater and the first structural layer such that far infrared radiation from the film heater is directed toward the first open cell layer.

17 Claims, 2 Drawing Sheets

(56) References Cited

OTHER PUBLICATIONS

F. Vatansever et al., "Far infrared radiation (FIR): its biological effects and medical applications", from https://www.ncbi.nlm.nih.gov/pmc/articles/PMC3699878/, Nov. 1, 2012, 21 pages.
D. Bradley, "The hot new rad pad", from https://www.materialstoday.com/carbon/comment/the-hot-new-grad-pad/, Jun. 2, 2015, 5 pages.
Nanocomp Technologies, Inc., "Applications: Heating", from http://www.nanocomptech.com/heating, 2016, 3 pages.
Extended European Search Report for EP Application No. 19152759.7, dated May 15, 2019, 7 pages.

\* cited by examiner

US 10,780,973 B2

CARBON NANOTUBE HEATERS FOR AIRCRAFT HEATED FLOOR PANELS

BACKGROUND

The present invention relates generally to aircraft panels and more particularly to heated floor panels.

An aircraft may include heated floor panels to mitigate the effects of cold underfloor temperatures and to help maintain a comfortable cabin temperature. The floor panels have structural integrity sufficient to support the weight of people and objects resting on the panels. A metal skin typically forms the top surface of the panel to protect the underlying layers from punctures from high heels, chips from dropped objects, scratches from dragged luggage and/or other floor-traffic related hazards. Some type of floor covering (e.g., carpeting, tiling) is typically placed over the panels for comfort and/or appearance. A heated floor panel can include a weight-supporting layer and a heating layer. The floor panel can also include an insulating layer to prevent heat from exiting the aircraft compartment.

The heating layer of the heated floor panels can be placed just under the metal sheet or near the top surface of the floor. This makes the heating elements of the floor panels susceptible to damage due to mechanical stresses or fluid intrusion during general use. To address this issue, additional protective layers can be placed over the heating layer. While effective at providing protection to the heating layer, such protective layers can reduce thermal conductivity from the heating layer to the panel surface. In order to achieve a desired panel temperature, power input to the heating layer must be increased.

SUMMARY

A floor panel includes a first structural layer, a film heater configured to emit far-infrared radiation, and a first open cell layer disposed between the film heater and the first structural layer such that far infrared radiation from the film heater is directed toward the first open cell layer.

A method of assembling a floor panel for an aircraft cabin includes joining an open cell layer to a film heater comprising a first far infrared-transparent material, and joining a structural layer to the open cell layer, such that the open cell layer is disposed between the structural layer and the film heater and such that far infrared radiation from the film heater is directed toward the first open cell layer.

The present summary is provided only by way of example, and not limitation. Other aspects of the present disclosure will be appreciated in view of the entirety of the present disclosure, including the entire text, claims and accompanying figures.

Figure 1:
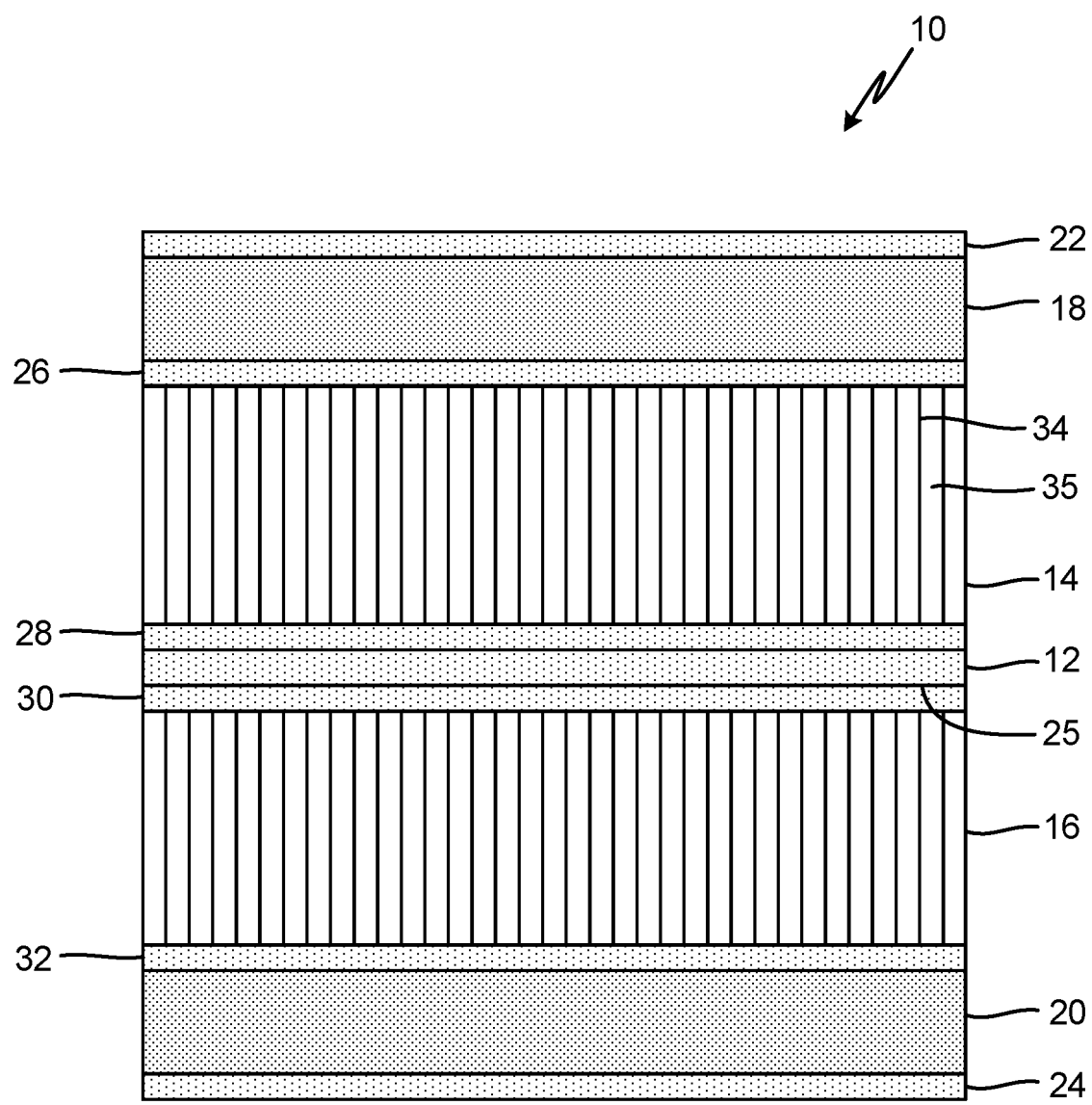
FIG. 1 is a schematic cross-section of one embodiment of a heated floor panel.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present invention incorporates a far infrared-transparent material in heated floor panels of an aircraft to improve heating efficiency. Heated floor panels can be used in aircraft to provide heat to cabin and cockpit areas. Typically, such panels require robust structural layers to protect a heating element from damage due to foot traffic, baggage, and roller carts. An open cell layer placed over a film heater can protect the film heater from mechanical stresses, however, can reduce thermal conductivity via conduction and convection from the film heater to the panel surface. To improve heat transfer, a far infrared-transparent material is incorporated between the film heater and the open cell layer and/or other protective layers. The far infrared-transparent material transmits radiant heat energy to the panel surface through air in the overlying open cell structure. The addition of thermal radiation improves heat transfer efficiency over conduction and convection alone.

FIG. 1 is a schematic cross-section of one embodiment of floor panel 10. Floor panel 10 includes film heater 12, outer and inner open cell layers 14 and 16, outer and inner structural layers 18 and 20, and outer and inner skins 22 and 24. Outer open cell layer 14 can include facing sheets 26 and 28 disposed on either side of the open cell structure. Inner open cell layer 14 can include facing sheets 30 and 32 disposed on either side of the open cell structure. Film heater 12 can be disposed between outer and inner open cell layers 14 and 16, which can be disposed between outer and inner structural layers 18 and 20 in a sandwich-like structure. Although depicted in FIG. 1, inner open cell layer 16 and outer and inner structural layers 18 and 20 can be omitted from floor panel 10 design or varied in size or type of material. Film heater 12 provides floor heating in the aircraft cabin, cockpit, or compartment where floor panel 10 is installed. Typically, the outer surface temperature of floor panels 10 can be maintained at 40 degrees Celsius using film heater 12. Outer open cell layer 14, outer structural layer 18, and outer skin 22 protect film heater 12 from damage caused by mechanical stresses due to impact, punctures, and increased load (e.g., dropped objects, rolling food carts and luggage, etc.). Optional inner open cell layer 16 and inner structural layer 20 can provide additional structural support and/or insulation for floor panel 10. Skins 22 and 24 provide outermost and innermost surface covers for floor panel 10.

Film heater 12 can be a resistive carbon nanotube (CNT) film heater made of nonwoven carbon nanotube fabric, as known in the art. In other embodiments, film heater 12 can be made of a CNT-filled plastic or graphene material or printed conductive CNT or graphene inks. Film heater 12 can incorporate a far infrared-transparent material to improve heat transfer to the adjacent open cell layer 14. For example, a conventional "dry" CNT fabric (fabric absent adhesives, resin, or polymers) can be impregnated with a far infrared-transparent material, including, but not limited to, polyolefin including high-density polyethelene, polypropylene, or ceramic filled resins such as $SiO_2$ filled polystyrene resin, styrene-acrylonitrile copolymer, polycarbonate resin, polyacrylonitrile resin, acrylic resins, and transparent acrylonitrile-butadiene-styrene copolymer, as described in U.S. Pat. No. 5,234,985. For CNT-filled plastic, the plastic can be a far infrared material. The far infrared-transparent material can allow for the passage of far infrared radiation (e.g., wavelength range of 7 μm to 14 μm), which can transmit heat energy through air in outer open cell layer 14 to reach outer layers 18 and 22 of floor panel 10. The use of far infrared radiation provides an improvement over floor panel heating that relies on conduction and convection alone. Film heater 12 can include far infrared-reflective coating 25 on a backside surface (opposite a surface adjacent to outer open cell layer 14) and facing film heater 12 to direct far infrared radiation from film heater 12 to outer floor panel layers, including outer skin 22. Infrared-reflective materials can include, for example, a silver mirror coating, a gold mirror coating, or an all dielectric coating.

Film heater 12 can be connected to an electric power source via a metallic strip or bus bar (not shown). Film heater 12 can be connected to the metallic strip or bus bar via a conductive adhesive or mechanical means of attachment. Electric current flowing through conductive material (e.g., carbon nanotubes or graphene) in film heater 12 can produce heat via Joule or resistive heating. In addition to providing conduction heating to adjacent materials, film heater 12 can transmit radiant heat energy via the far infrared-transparent material.

Outer open cell layer 14 can overlay film heater 12. Outer open cell layer 14 can be attached to film heater 12 via facing sheet 28. Facing sheet 28 can provide an interface for the open cell structure for assembly with film heater 12. Facing sheet 28 can be a fiberglass or carbon fiber material impregnated with an infrared-transparent material, which can be the same far infrared-transparent material incorporated into film heater 12, to allow transmission of far infrared radiation from film heater 12 through facing sheet 28. Fiberglass and carbon fiber materials can include chopped, woven, or unidirectional fibers as appropriate to provide adequate structural reinforcement for outer open cell layer 14. Following assembly, the far infrared-transparent material of film heater 12 and facing sheet 28 can be co-cured to bond the two layers. The far infrared-transparent material of facing sheet 28 can transmit radiant heat energy from film heater 12 through outer open cell layer 14. While inner open cell layer 16 may also incorporate a far infrared-transparent material, infrared radiation can be primarily transmitted from facing sheet 28 through open spaces of the open cell structure of open cell layer 14 to the overlying facing sheet 26, outer structural layer 18, or outer skin 22.

The far infrared-transparent materials of film heater 12 and facing sheet 28 improve heat transfer through outer open cell layer 14. Absent far infrared-transparent material, heat is transferred via conduction and convection. In conduction heating, thermal energy is transferred from film heater 12 through the solid medium of adjoining outer open cell layer 14, structural layer 18, and skin 22. In convection heating, thermal energy is transferred to air in outer open cell layer 14. Both conduction heating and convection heating are less efficient in transmitting thermal energy to outer skin 22. Additional power must be supplied to film heater 12 to increase the temperature of film heater 12 sufficiently to overcome ineffective heat transfer and to provide a desired panel temperature. In contrast, radiant heating, provided by way of the far infrared-transparent materials, transmits far infrared radiation through open spaces in outer open cell layer 14 and to overlying facing sheet 26, structural layer 18, or skin 22 with little loss. In this manner, the far infrared-transparent materials allow for improved surface heating with a lower power input to film heater 12.

Outer and inner open cell layers 14 and 16 can provide impact resistance and structural support to floor panel 10 and can protect film heater 12 from damage. Open cell layer 14 can include a plurality of vertically-extending and connected walls 34, which separate vertically-aligned open cells 35. Open cells 35 extend through a full thickness of outer open cell structure 14 to provide a plurality of pathways substantially perpendicular to film heater 12 for transmission of far infrared radiation from film heater 12. In some embodiments, outer and inner open cell layers 14 and 16 can be formed from an expanded honeycomb (e.g., Kevlar® or Nomex® honeycomb). The cross-sectional area of open cells 35 can be optimized to improve far infrared transmission through outer open cell layer 14, while maintaining sufficient structural support. Larger cross-sectional areas can provide for better transmission. Although the hexagonal structure of honeycomb provides relatively high compression properties, other geometrical shapes can be used. A thickness of outer open cell layer 16 can also be varied as necessary to provide adequate structural support. As previously discussed, in some embodiments, inner open cell layer 16 can be omitted from the floor panel 10 design depending on structural requirements. Although FIG. 1 depicts outer and inner open cell layers 14 and 16 having the same thickness, in some embodiments, it may be desirable to reduce or increase the thickness of either outer or inner open cell layer 14 or 16 depending on structural and heat transfer requirements. In general, outer open cell layer 14 can be thinner than inner open cell layer 16 to bring film heater 12 closer to outer skin 22, while maintaining a combined total thickness of open cell layers 14, 16 sufficient for structure mechanical strength. In some embodiments, inner open cell layer 16 can be omitted, in which case, the thickness of outer open cell layer 14 is increased to provide sufficient structural mechanical strength. Increasing the thickness of outer open cell layer 14 can have a negligible impact on heating efficiency as the primary heating mechanism is via far infrared radiation as opposed to convection or conduction. As long as open pathways exists through outer open cell layer 14, infrared radiation can be transmitted.

In some embodiments, inner open cell layer 16 can be formed from open cell or closed cell foam. Because heat need not be transmitted through inner open cell layer 16 and, in fact, is limited by far infrared-reflective coating 25 applied to the backside surface of film heater 12, inner open cell layer 16 does not require open cells to transmit infrared radiation. For the same reason, facing sheets 30 and 32 on inner open cell layer 16 do need to incorporate infrared-transparent material.

Similar to facing sheet 28, facing sheets 30 and 32, as well as facing sheet 26 on outer open cell layer 14 can be a pre-impregnated fiberglass or carbon fiber material. Facing sheet 26 on outer open cell layer 14 can be impregnated with a far infrared-transparent or far infrared-opaque material.

Outer structural layer 18 can overlay outer open cell layer 14. Inner structural layer 20 can underlay inner open cell layer 16 or film heater 12 in the absence of inner open cell layer 16. Outer and inner structural layers 18 and 20 can protect film heater 12 from damage and/or provide additional structural support for floor panel 10. Outer and inner structural layers 18 and 20 can be a composite material including fiberglass or carbon fiber material pre-impregnated with a resin, as known in the art. Both outer and inner structural layers 18 and 20 can include multiple plies depending on, for example, the material chosen to form the structural layers or the robustness of film heater 12. Outer structural layer 18 can be impregnated with a far infrared-transparent or infrared-opaque material. Because transmission of far infrared radiation to inner structural layer 20 is limited by far infrared-reflective coating 25 applied to the backside surface of film heater 12, inner structural layer 20 can be impregnated with any suitable material as known in the art to provide the structural support needed. Heat can generally be transmitted through outer structural layer 18 to outer skin 22 via conduction. Both outer and inner structural layers 18 and 20 can be varied in thickness and/or material composition depending on the structural and/or heat transfer requirements.

Outer and inner skins 22 and 24 can form the outermost and innermost surfaces of floor panel 10, with outer surface 22 adjacent the cabin, cockpit, or compartment environment in which floor panel 10 provides floor heating. Outer and inner skins 22 and 24 can be a composite material (e.g., pre-impregnated fiberglass, carbon fiber, Kevlar®, or combinations thereof). In some embodiments, outer skin 22 can be a metal.

Figure 2:
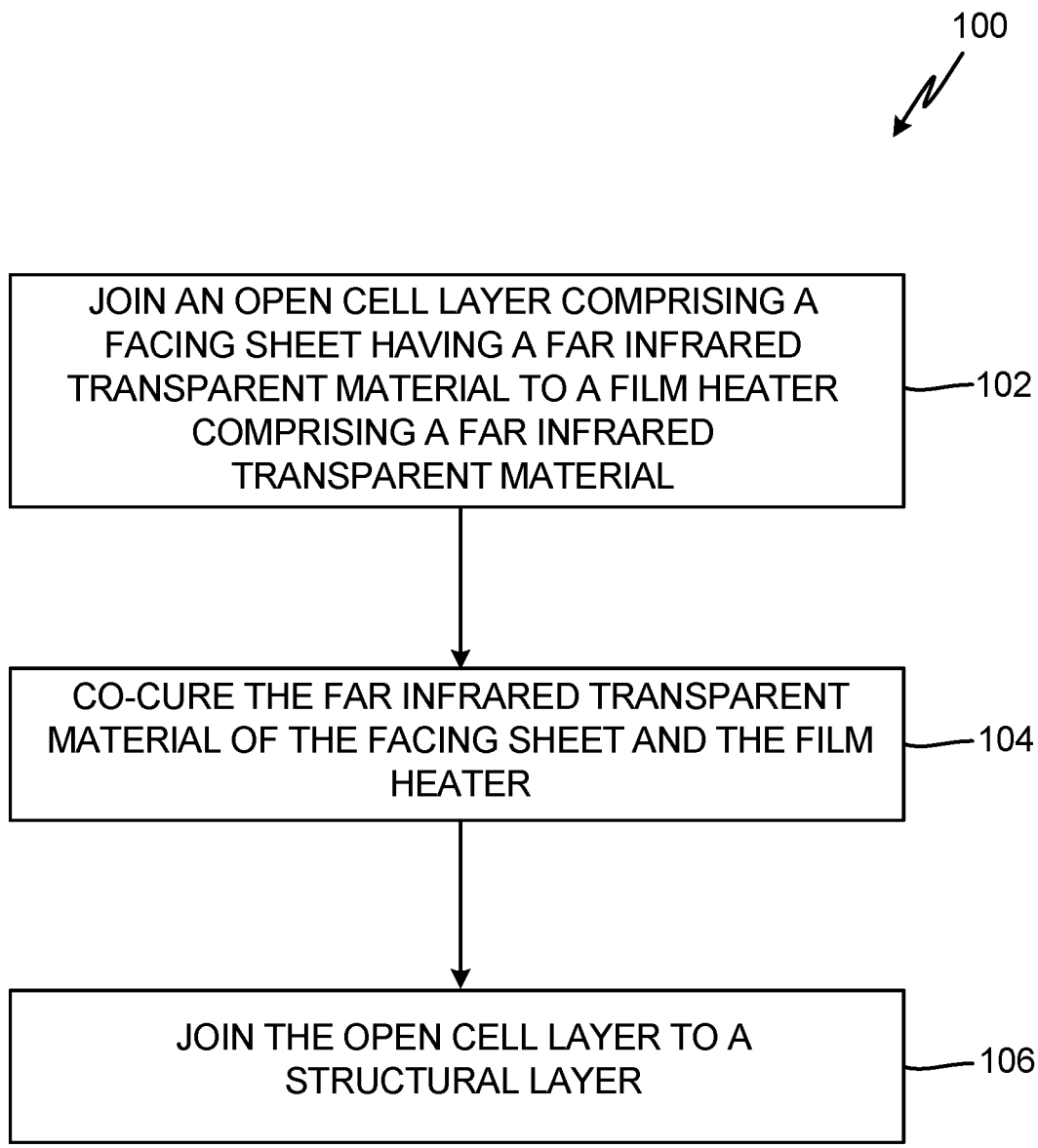
FIG. 2 is a flow chart of a method of making a heated floor panel.

FIG. 2 is a flow chart of a method 100 of making a heated floor panel. Method 100 includes joining outer open cell layer 14 to film heater (step 102) by adhering partially cured far infrared-transparent materials of film heater 12 and facing sheet 28, co-curing the far infrared-transparent material of film heater 12 and facing sheet 28 to harden the far infrared-transparent material and increase the bond strength between the adjoining layers (step 104), and joining outer structural layer 18 or outer skin 22 to outer open cell layer 14 (step 106). The far infrared-transparent material can serve as an adhesive for assembling layers of floor panel 10. Alternative adhesives as known in the art can be used to join other layers of floor panel 10, including outer and inner structural layers 18 and 20 and skins 22 and 24.

The incorporation of a far infrared-transparent material between film heater 12 and the protective layers of floor panel 10, particularly outer open cell layer 14, can improve heat transfer through floor panel 10 and thereby improve heating efficiency.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A floor panel includes a first structural layer, a film heater configured to emit far-infrared radiation, and a first open cell layer disposed between the film heater and the first structural layer such that far infrared radiation from the film heater is directed toward the first open cell layer.

The floor panel of the preceding paragraph can optionally include, additionally and/or alternatively, any one or more of the following features, configurations and/or additional components:

The floor panel of the preceding paragraph, wherein the film heater can include a material selected from a group consisting of a carbon nanotube fabric and a graphene sheet, and wherein the material can be impregnated with the far infrared-transparent material.

The floor panel of any of the preceding paragraphs, wherein the far infrared-transparent material can be an adhesive.

The floor panel of any of the preceding paragraphs can further include a first facing sheet disposed between and connecting the film heater and the first open cell layer, wherein the first facing sheet includes a far infrared-transparent material and is configured to allow transmission of far infrared radiation from the film heater through the first facing sheet.

The floor panel of any of the preceding paragraphs, wherein the first facing sheet can include a layer of a material selected from the group consisting of fiberglass and carbon fiber, and wherein the material can be impregnated with the far infrared-transparent material.

The floor panel of any of the preceding paragraphs, wherein the first open cell layer can include a plurality of vertically-aligned open cells that extend a full thickness of the first open cell layer.

The floor panel of any of the preceding paragraphs can further include a far infrared-reflective coating on a backside surface of the film heater opposite the first open cell layer, wherein the far infrared-reflective coating faces the film heater to direct far infrared radiation from the film heater toward the first open cell layer.

The floor panel of any of the preceding paragraphs can further include a second open cell layer, wherein the film heater is disposed between the first and second open cell layers.

The floor panel of any of the preceding paragraphs, wherein the first structural layer can include a material opaque to far infrared radiation.

The floor panel of any of the preceding paragraphs, wherein the first structural layer can include a fiberglass or carbon fiber pre-impregnated with a resin.

The floor panel of any of the preceding paragraphs can further include a skin layer disposed on the first structural layer and forming an outermost layer of the floor panel, wherein the skin layer comprises a metal or a composite material.

The floor panel of any of the preceding paragraphs can further include a second structural layer, wherein the film heater is disposed between the first open cell layer and the second structural layer.

A method of assembling a floor panel for an aircraft cabin includes joining an open cell layer to a film heater comprising a first far infrared-transparent material, and joining a structural layer to the open cell layer, such that the open cell layer is disposed between the structural layer and the film heater and such that far infrared radiation from the film heater is directed toward the first open cell layer.

The method of the preceding paragraph can optionally include, additionally and/or alternatively, any one or more of the following steps, features, configurations and/or additional components:

The method of the preceding paragraph, wherein the open cell layer can include a first facing sheet disposed between and connecting the film heater and an open cell structure of the open cell layer, wherein the first facing sheet can include a second far infrared-transparent material and can be configured to allow transmission of far infrared radiation from the film heater through the first facing sheet.

The method of any of the preceding paragraphs, wherein the film heater can include a far infrared-reflective coating disposed on a side of the film heater opposite the first facing sheet and configured to direct far infrared radiation from the film heater toward the open cell layer.

The method of any of the preceding paragraphs, wherein the open cell layer can include a plurality of vertically-aligned open cells that extend a full thickness of the open cell layer.

The method of any of the preceding paragraphs, wherein the film heater can include a material selected from a group consisting of a carbon nanotube fabric and a graphene sheet.

The method of any of the preceding paragraphs, wherein the material of the film heater can be impregnated with the first far infrared-transparent material.

The method of any of the preceding paragraphs can further include co-curing the first and second far infrared materials.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A floor panel comprising:
   a first structural layer;
   a film heater configured to emit far infrared radiation;
   a first open cell layer disposed between the film heater and the first structural layer such that far infrared radiation from the film heater is directed toward the first open cell layer; and
   a second open cell layer, wherein the film heater is disposed between the first and second open cell layers and wherein a thickness of the first open cell layer is less than a thickness of the second open cell layer.

2. The floor panel of claim 1, wherein the film heater comprises a first far infrared-transparent material.

3. The floor panel of claim 2, wherein the film heater comprises a material selected from a group consisting of a carbon nanotube fabric and a graphene sheet, and wherein the material is impregnated with the first far infrared-transparent material.

4. The floor panel of claim 2, wherein the first far infrared-transparent material is an adhesive.

5. The floor panel of claim 1 and further comprising:
   a first facing sheet disposed between and connecting the film heater and the first open cell layer, wherein the first facing sheet comprises a second far infrared-transparent material and is configured to allow transmission of far infrared radiation from the film heater through the first facing sheet.

6. The floor panel of claim 4, wherein the first facing sheet comprises a layer of a material selected from the group consisting of fiberglass and carbon fiber, and wherein the material is impregnated with the second far infrared-transparent material.

7. The floor panel of claim 4, wherein the first open cell layer comprises a plurality of vertically-aligned open cells that extend a full thickness of the first open cell layer.

8. The floor panel of claim 1 and further comprising:
   a far infrared-reflective coating on a backside surface of the film heater opposite the first open cell layer, wherein the far infrared-reflective coating faces the film heater to direct far infrared radiation from the film heater toward the first open cell layer, and wherein the far infrared-reflective coating is selected from a group consisting of a silver mirror coating, a gold mirror coating, and an all dielectric coating.

9. The floor panel of claim 1, wherein the first structural layer comprises a material opaque to far infrared radiation.

10. The floor panel of claim 1, wherein the first structural layer comprises a fiberglass or carbon fiber pre-impregnated with a resin.

11. The floor panel of claim 1 and further comprising:
    a skin layer disposed on the first structural layer and forming an outermost layer of the floor panel, wherein the skin layer comprises a metal or a composite material.

12. The floor panel of claim 1 and further comprising:
    a second structural layer, wherein the film heater is disposed between the first open cell layer and the second structural layer.

13. A method of assembling a floor panel for an aircraft cabin, the method comprising:
    joining a first open cell layer to a first side of a film heater comprising a first far infrared-transparent material, wherein the first open cell layer has a first thickness, and wherein the first open cell layer comprises a first facing sheet disposed between and connecting the film heater and an open cell structure of the first open cell layer, the first facing sheet comprising a second far infrared-transparent material and configured to allow transmission of far infrared radiation from the film heater through the first facing sheet;
    joining a structural layer to the open cell layer, such that the open cell layer is disposed between the structural layer and the film heater and such that far infrared radiation from the film heater is directed toward the first open cell layer;
    applying a far infrared-reflective coating to a second side of the film heater opposite the first side, the far infrared-reflective coating being configured to direct far infrared radiation from the film heater toward the first open cell layer; and
    joining a second open cell layer to the second side of the film heater, wherein the second open cell layer has a second thickness, the second thickness being greater that the first thickness.

14. The method of claim 13, wherein the film heater comprises a material selected from a group consisting of a carbon nanotube fabric and a graphene sheet.

15. The method of claim 14, wherein the material of the film heater is impregnated with the first far infrared-transparent material.

16. The method of claim 13 and further comprising:
    co-curing the first and second far infrared materials.

17. The floor panel of claim 1, wherein the first open cell layer comprises a third far infrared-transparent material.

* * * * *